(12) United States Patent
Blanchard et al.

(10) Patent No.: US 8,113,240 B2
(45) Date of Patent: Feb. 14, 2012

(54) LOW EMISSION FLUID TRANSFER DEVICE

(75) Inventors: Frederick W. Blanchard, Battle Creek, MI (US); Alex L. Hoffman, Bellevue, MI (US)

(73) Assignee: Marshall Excelsior Company, Marshall, MI (US)

( * ) Notice: Subject to any disclaimer, the term of this patent is extended or adjusted under 35 U.S.C. 154(b) by 761 days.

(21) Appl. No.: 12/184,752

(22) Filed: Aug. 1, 2008

(65) Prior Publication Data

US 2010/0024904 A1 Feb. 4, 2010

(51) Int. Cl.
*F16K 1/44* (2006.01)

(52) U.S. Cl. ......... 137/630.14; 137/630.15; 137/630.22; 137/614.06; 251/149.9

(58) Field of Classification Search ............. 137/630.14, 137/630.15, 630.22, 614.06; 251/149.9
See application file for complete search history.

(56) References Cited

U.S. PATENT DOCUMENTS

| | | | |
|---|---|---|---|
| 491,166 A * | 2/1893 | Gold ........................ | 137/630.14 |
| 2,753,219 A | 7/1956 | Matarese | |
| 2,806,741 A | 9/1957 | Fishelson et al. | |
| 2,904,351 A * | 9/1959 | Gellett et al. ............ | 137/630.14 |
| 3,168,125 A | 2/1965 | Rosell | |
| 3,664,634 A | 5/1972 | Guertin et al. | |
| 3,861,415 A | 1/1975 | Larsen | |
| 4,005,598 A | 2/1977 | Ehmann et al. | |
| 4,030,666 A | 6/1977 | Gagliardo | |
| 4,040,456 A | 8/1977 | Defrees | |
| 4,195,692 A | 4/1980 | Dion-Biro | |
| 4,546,789 A | 10/1985 | Taylor | |
| 4,589,439 A | 5/1986 | Steingass | |
| 4,638,842 A | 1/1987 | Hawley et al. | |
| 4,982,929 A | 1/1991 | Spurling | |
| 5,312,048 A | 5/1994 | Steingass et al. | |
| 5,316,033 A | 5/1994 | Schumacher et al. | |
| 5,337,797 A | 8/1994 | Janssen et al. | |
| 5,404,909 A | 4/1995 | Hanson | |
| 5,622,201 A | 4/1997 | Chang | |
| 5,628,344 A | 5/1997 | Roberts | |
| 5,975,491 A | 11/1999 | Mann | |
| 6,234,224 B1 | 5/2001 | Schultz, Jr. | |
| 6,305,621 B1 | 10/2001 | Kolacz et al. | |
| 6,354,320 B1 | 3/2002 | Kolacz et al. | |
| 6,405,768 B1 | 6/2002 | McClaran | |
| 6,467,500 B2 | 10/2002 | Fridlyand | |
| 6,491,056 B2 * | 12/2002 | Gibb ........................ | 137/630.14 |
| 6,622,760 B2 | 9/2003 | Peattie | |
| 6,705,550 B2 | 3/2004 | Bell | |
| 6,729,351 B2 * | 5/2004 | Bircann et al. ........... | 137/630.14 |
| 6,799,600 B2 | 10/2004 | O'Neal | |
| 6,820,630 B2 | 11/2004 | Carringer et al. | |
| 6,957,661 B1 * | 10/2005 | Borton et al. ............. | 137/630.15 |
| 7,137,578 B2 | 11/2006 | Steingass et al. | |
| 7,152,630 B2 | 12/2006 | Krywitsky | |
| 2006/0067837 A1 | 3/2006 | Kanou et al. | |
| 2007/0163672 A1 | 7/2007 | Luntz et al. | |

* cited by examiner

*Primary Examiner* — Kevin Lee
(74) *Attorney, Agent, or Firm* — Howard & Howard Attorneys PLLC

(57) ABSTRACT

A fluid transfer system includes a transfer device coupled to a dry break coupler. The transfer device includes a valve assembly moveable between an open and a closed position. The valve assembly includes a main valve and a pilot valve. An actuator controls both the main valve and the pilot valve. A cam plate interconnects the actuator and the valve assembly. The cam plate provides a quick acting shutoff to quickly move the valve assembly to the closed position. A pivotal and rotatable connector couples the transfer device to the dry break coupler. A lock is integrated with the actuator to lock the valve assembly in the closed position.

16 Claims, 13 Drawing Sheets

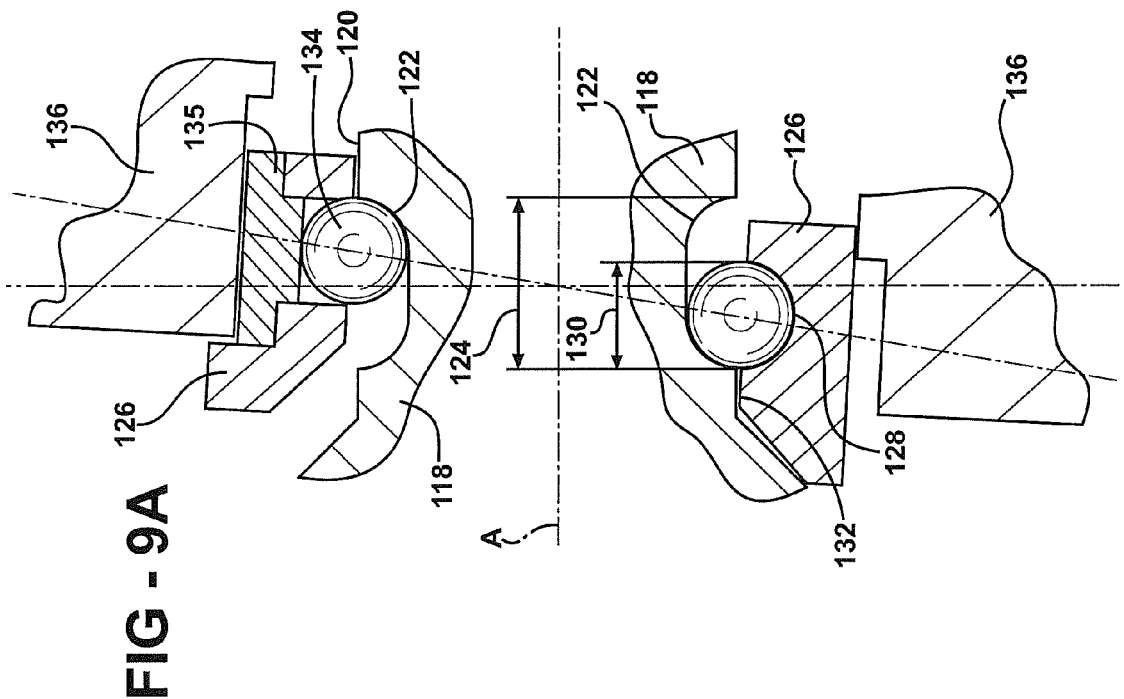
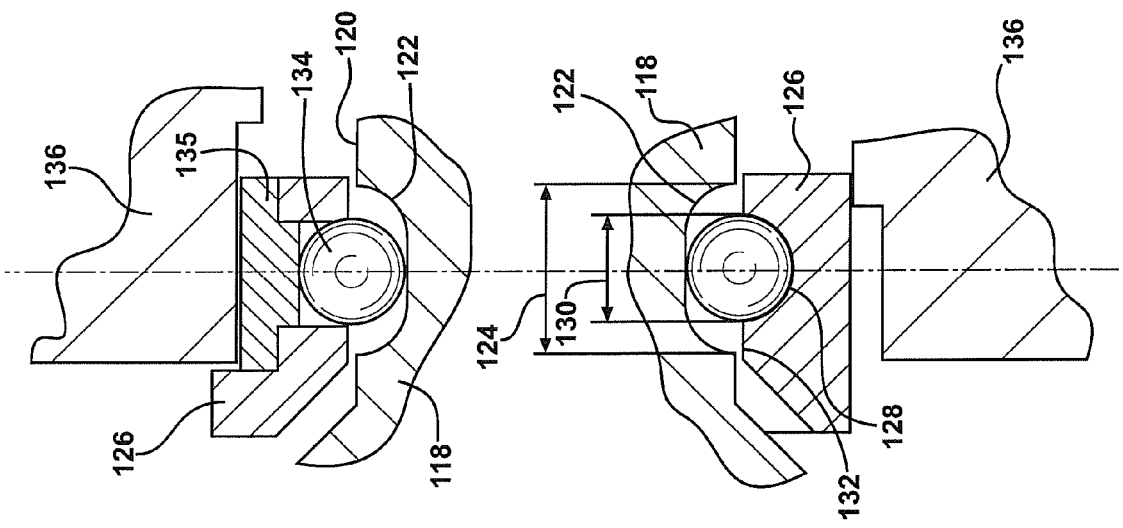

LOW EMISSION FLUID TRANSFER DEVICE

FIELD OF THE INVENTION

The present invention generally relates to fluid transfer systems for providing fluid communication between a fluid source and a fluid destination. More specifically, the present invention relates to a fluid transfer system including a transfer device and a dry break coupler that releasably join together to link the fluid source and the fluid destination.

BACKGROUND OF THE INVENTION

Fluid transfer systems are generally used for transferring fluid, e.g., gas or liquid, from a fluid source, e.g., a delivery truck, to a fluid destination, e.g., a storage tank. These fluid transfer systems often use conventional valve assemblies and conduits to communicate and manage fluid flow. Typically, a transfer device includes a valve assembly that opens to release the flow of fluid from the delivery truck. The storage tank often includes a receiver or connector to which the transfer device is releasably coupled. Once the transfer device is mounted to the receiver on the storage tank, the valve assembly is opened and fluid moves from the delivery truck to the storage tank.

When the delivery is complete, the transfer device is de-coupled from the receiver. As this occurs, fluid often escapes or vaporizes into the atmosphere due to the volume of space inside the transfer device that opens to atmosphere and the volume of space inside the receiver that opens to atmosphere. This waste can be costly when added across hundreds to thousands of deliveries. Emissions from some fluids can also be hazardous or damaging to the environment. In addition to the emissions associated with de-coupling the transfer device and receiver, inadvertent emissions can also occur by accidentally opening the valve assembly prior to being ready for transfer.

Many prior art transfer devices use levers or hand wheels for opening and closing valve assemblies to manage the fluid flow between the fluid source and the fluid destination. Some levers or hand wheels require an excessive amount of torque to close the valve assembly and stop fluid flow during an inadvertent emission. Some levers or actuators also require a high degree of rotation, e.g., 90 degrees of rotation or more, to close the valve assemblies. The extra effort and time to close the valve assemblies can result in large amounts of unnecessary fluid emissions.

The interconnection of the transfer device and the receiver in prior art systems can often be difficult for an operator. For example, the transfer device typically must be elevated and lined up accurately to the receiver to couple the two together. The equipment is normally very heavy for an operator to carry and couple to the receiver simultaneously. In this situation, it is desired to provide an effective coupling technique to avoid any body strain to the operator from carrying and installing the equipment.

Therefore, there is a need in the art to provide a fluid transfer system that controls fluid communication in a way that helps reduce fluid emissions. Furthermore, there is a need in the art to provide a transfer device that is more maneuverable and easy to operate.

SUMMARY OF THE INVENTION AND ADVANTAGES

The present invention provides a transfer device for transferring fluid. The transfer device includes a housing defining a bore. An actuator is coupled to the housing for movement relative to the housing. A valve assembly is disposed in the bore and is moveable between an open position and a closed position. The valve assembly includes a main valve moveable between an open-main valve position and a closed-main valve position and a pilot valve moveable between an open-pilot valve position and a closed-pilot valve position. The actuator is operatively coupled to the valve assembly such that the pilot valve and the main valve are each moveable in response to the movement of the actuator with the pilot valve reaching the open-pilot valve position before the main valve reaches the open-main valve position.

The pilot valve feature allows the actuator to move the main valve without requiring much force when the transfer device is mounted to a suitable receiver, but makes it difficult to open the main valve when the transfer device is disconnected from the receiver. For example, in one aspect of the invention, when the transfer device is mounted to the receiver and the pilot valve is moved to the open-pilot valve position, fluid is allowed to pressurize in front of and behind the main valve. This makes it easy to move the main valve to the open-main valve position and establish fluid communication. Conversely, when the transfer device is disconnected from the receiver, pressure of the fluid behind the main valve urges it into the closed position. It's not until the main valve is coupled to the receiver and pressure can be equalized in front of and behind the main valve that the operator can easily open the main valve. Pressures of about 25 to about 200 psi are often encountered, such as in liquid propane (LP) transfer.

The present invention also provides a transfer device comprising a housing defining a bore. A valve assembly is disposed in the bore and moveable between an open position and a closed position. An actuator is pivotally coupled to the housing for pivotal movement about a pivot axis to move the valve assembly between the open position and the closed position. A cam plate is disposed in the bore of the housing and interconnects the valve assembly and the actuator. The cam plate defines a cam profile having first and second distinct locations. The actuator engages the first location of the cam profile when the valve assembly is in the closed position and engages the second location of the cam profile when the valve assembly is in the open position. The actuator moves from the first location to the second location along the cam profile to move the cam plate thereby moving the valve assembly between the open and closed positions.

The cam plate provides a quick acting shut-off. The cam plate configuration allows the operator to bump the actuator and rotate the actuator only a fraction of a rotation to move the valve assembly to the closed position in a quick manner. This can be extremely useful in cases where leaks occur and fluid communication must be stopped immediately to avoid fluid loss.

The present invention further provides a transfer device for coupling to a receiver. The transfer device comprises a housing defining a bore having a first end and a second end disposed along a longitudinal axis. The housing further defines a first race having a first width adjacent the second end. A valve assembly is disposed in the bore and moveable between open and closed positions. An actuator is coupled to the valve assembly for moving the valve assembly between the open and closed positions. A connector is coupled to the housing about the second end and defines a second race having a second width. A plurality of bearing members are disposed between the first race and the second race for allowing rotational movement of the connector relative to the housing about the longitudinal axis. The connector pivots between different angular positions relative to the longitudinal axis to ease mounting of the transfer device to the receiver.

Thus, the connector can both swivel (or rotate) and pivot. The swiveling and pivoting motion provides assistance to couple the transfer device to the receiver. Typically, the transfer device needs to be aligned accurately with the receiver for coupling the two together. Due to the weight of the transfer device, which is formed primarily of metal components, this can often be difficult to achieve. With a pivoting and swiveling connector coupled to the housing, the transfer device does not need to be aligned perfectly with the receiver, making installation easier.

The present invention still further provides a transfer device for transferring fluid. The device comprises a housing defining a bore. A valve assembly is disposed in the bore and moves between an open position and a closed position. An actuator is pivotally coupled to the housing for pivotal movement about a pivot axis to move the valve assembly between the open position and the closed position. A lock is coupled to the actuator and moves between a locked position and an unlocked position. The housing defines at least one catch such that the lock is engaged in the catch when the valve assembly is in the closed position preventing the pivotal movement about the pivot axis and the lock is disengaged from the at least one catch when the lock is moved from the at least one catch allowing the pivotal movement about the pivot axis to move the valve assembly to the open position.

The lock secures the actuator to the housing to hold the valve assembly in the closed position. The lock further reduces any accidental movement to move the valve assembly to the open position, avoiding inadvertent loss of fluid.

BRIEF DESCRIPTION OF THE DRAWINGS

Other advantages of the present invention will be readily appreciated as the same becomes better understood by reference to the following detailed description when considered in connection with the accompanying drawings wherein:

FIG. 9 is a cross-sectional view of a connecting nut, coupling element, and ball bearing configuration in one position;

FIG. 9A is a cross-sectional view of the connecting nut, coupling element, and ball bearing configuration in another position;

DETAILED DESCRIPTION OF THE PREFERRED EMBODIMENT

Figure 1:
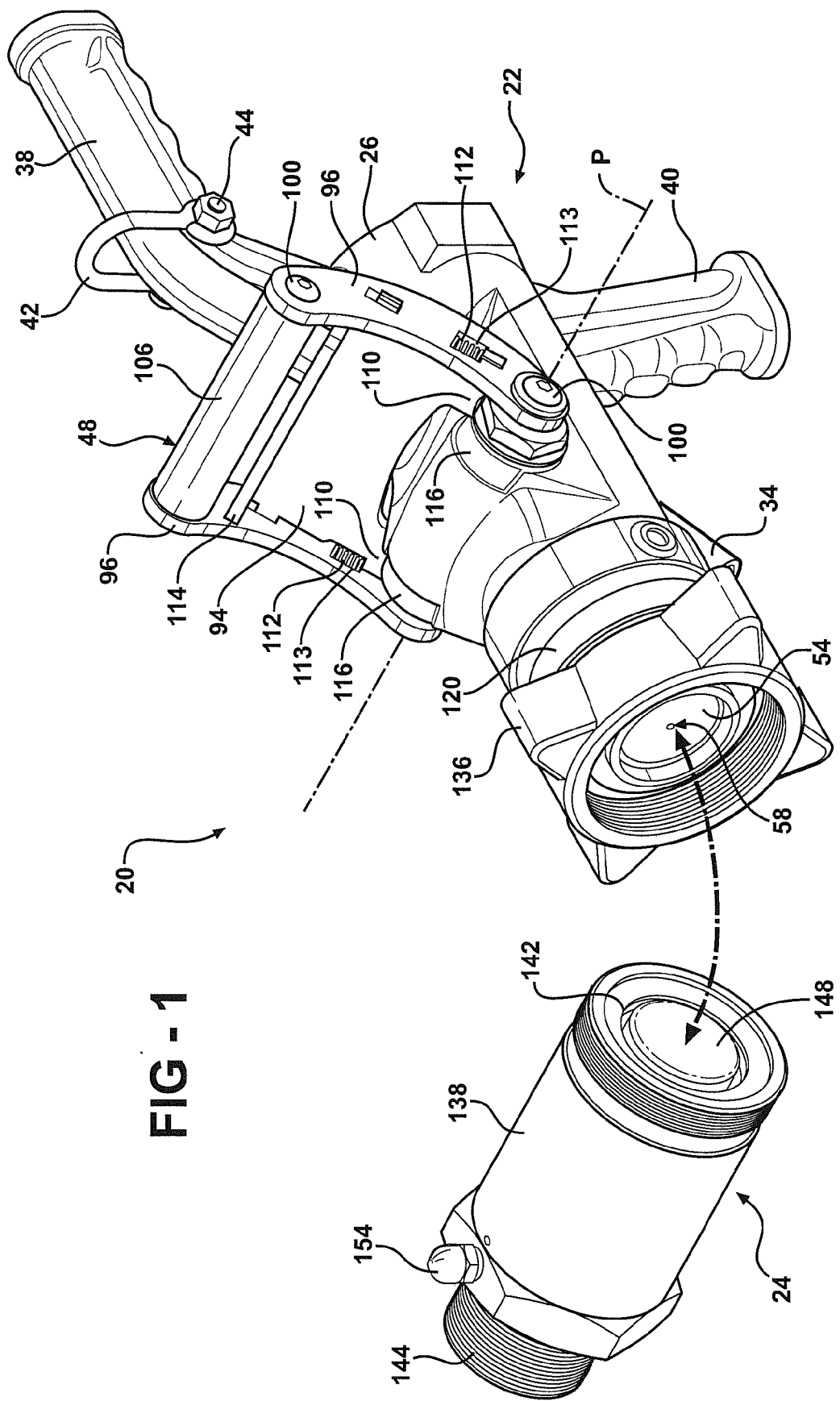
FIG. 1 is a perspective view of a fluid transfer system illustrating a transfer device and a dry break coupler.

Referring to the Figures, wherein like numerals indicate like or corresponding parts throughout the several views, a fluid transfer system is generally shown at 20. Referring to FIG. 1, the fluid transfer system includes a transfer device 22 and a dry break coupler 24. Generally, the transfer device 22 is coupled to a conduit (not shown) attached to a fluid source. The dry break coupler 24 is generally coupled to a conduit (not shown) attached to a fluid destination such as a storage tank. The transfer device 22 is configured to releasably connect to the dry break coupler 24 to provide fluid communication between the fluid source and the fluid destination. The fluid travels from the fluid source to the fluid destination under a fluid pressure. The fluid can include liquid or gas. The present invention is particularly adapted for transferring liquid propane, but is not intended to be so limited.

Figure 2:
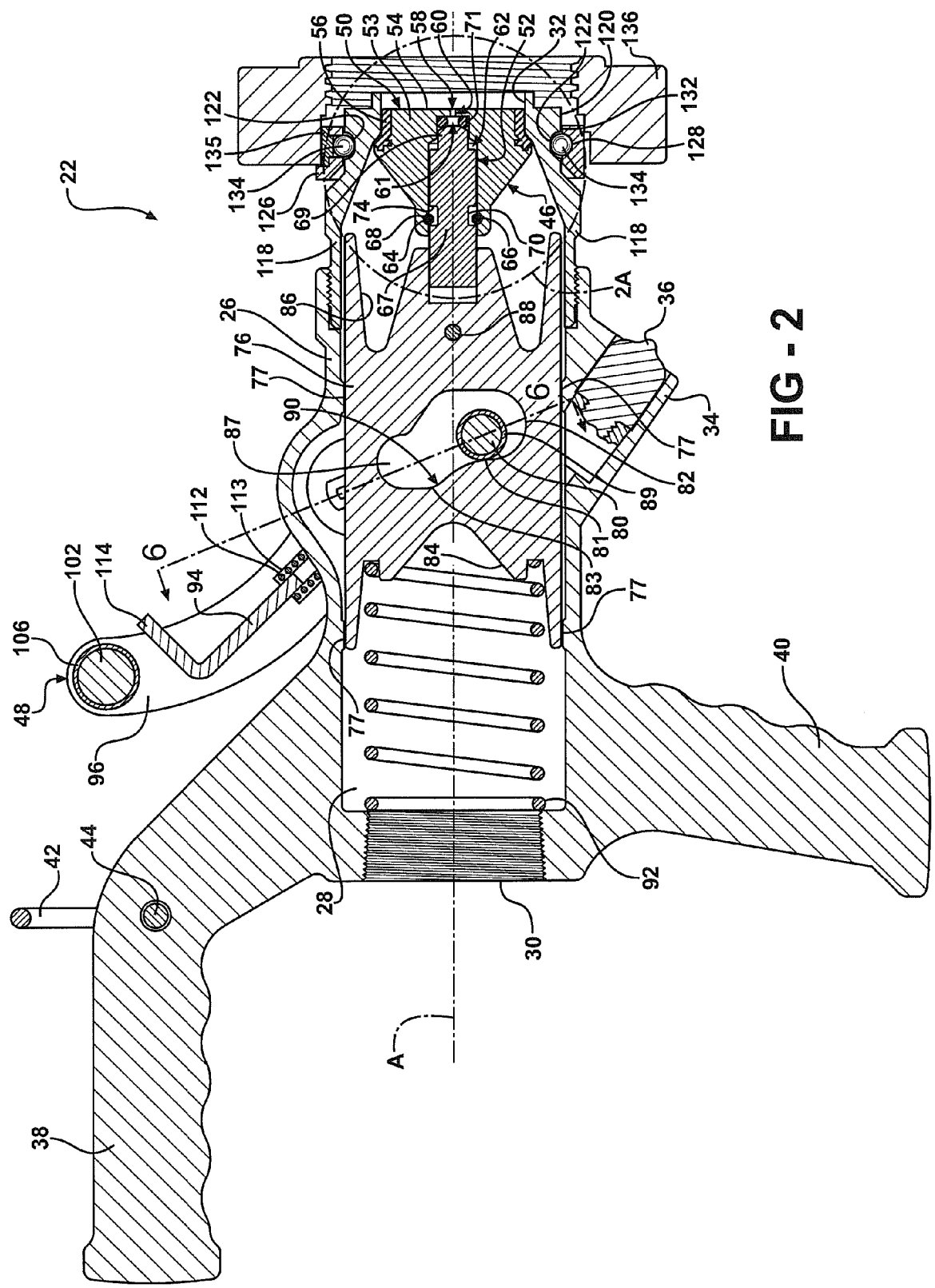
FIG. 2 is a cross-sectional view of the transfer device illustrating a main valve in a closed-main valve position and a pilot valve in a closed-pilot valve position.
Figure 2A:
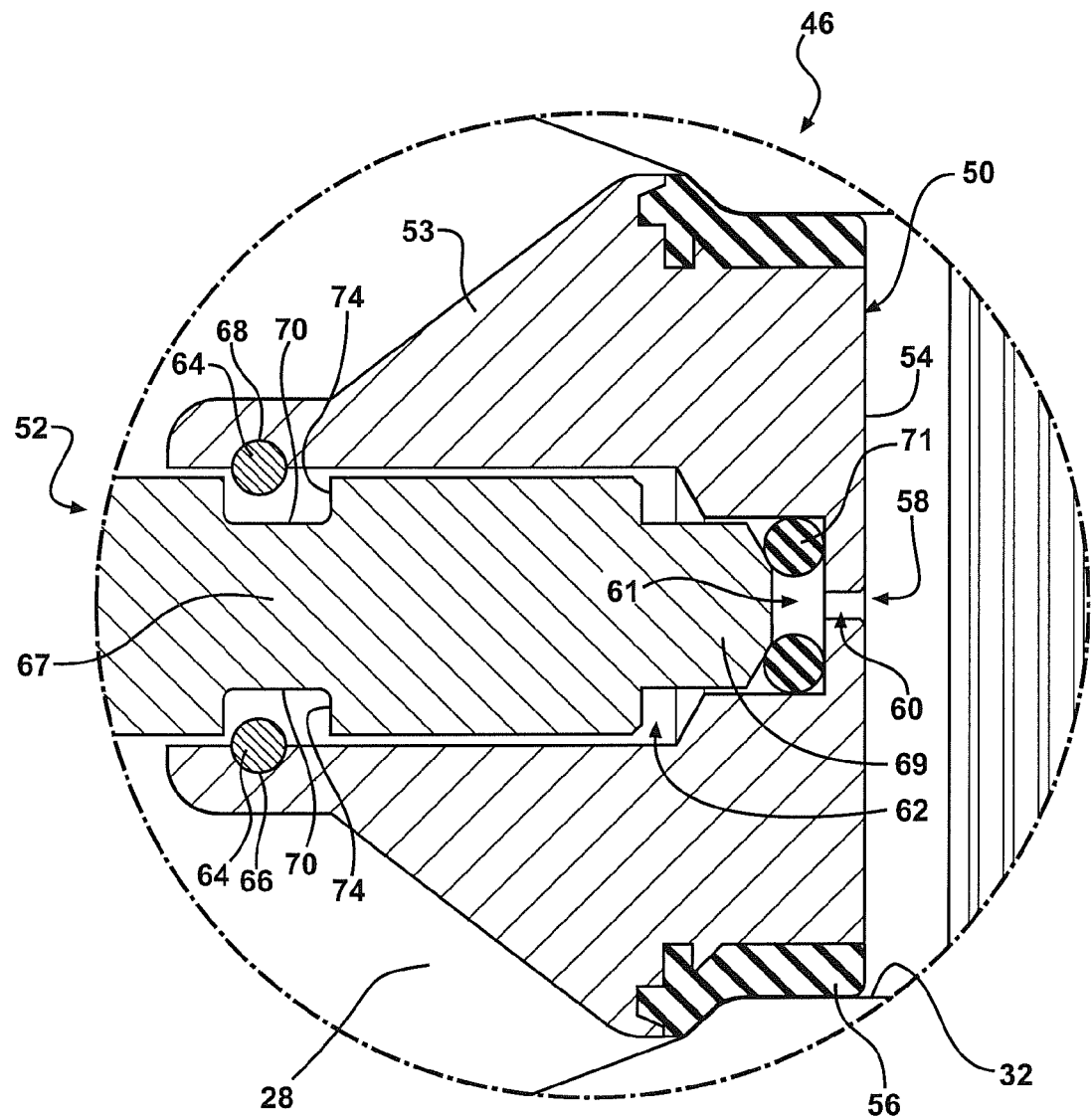
FIG. 2A is an exploded cross-sectional view of the main valve and the pilot valve illustrated in FIG. 2.

Referring to FIGS. 2 and 2A, the transfer device includes a housing 26 that defines a bore 28 having an inlet 30 and an outlet 32. The housing 26 may be made of a metal or alloy, such as cast iron, steel, or any other suitable material. The housing 26 is defined about a longitudinal axis A. The housing 26 includes an integrated valve collar 34 for receiving a pressure relief valve 36. The pressure relief valve 36 relieves the fluid pressure in instances where the fluid pressure inside the bore 28 of the housing 26 exceeds a predefined limit. The housing 26 defines a hole for providing communication with the pressure relief valve 36.

A top handle 38 and a bottom handle 40 are each integrated with the housing 26 for ease of carrying and maneuvering the transfer device 22. This is particularly useful when coupling the transfer device 22 to the dry break coupler 24 or other suitable receiver. A clip 42, generally having a U-shaped configuration, is coupled to the top handle 38 for hanging the transfer device 22 during storage or use. A fastener 44 couples the clip 42 to the top handle 38.

A valve assembly 46 is disposed in the bore 28 of the housing 26 and is moveable between an open position and a closed position. An actuator 48 is pivotally coupled to the housing 26 for pivotal movement about a pivot axis P. The pivotal movement of the actuator 48 moves the valve assembly 46 between the open position and the closed position. More specifically, the actuator 48 pivots toward the outlet 32 to move the valve assembly 46 from the closed position to the open position and the actuator 48 pivots away from the outlet 32 to move the valve assembly 46 from the open position to the closed position.

The valve assembly 46 includes a main valve 50 moveable between an open-main valve position and a closed-main valve position. The valve assembly further includes a pilot valve 52 moveable between an open-pilot valve position and a closed-pilot valve position. The main valve 50 and the pilot valve 52 may be made of a metal or alloy, such as stainless steel or carbon steel or any other suitable material. The actuator 48 is operatively coupled to the valve assembly 46. More specifically, the actuator 48 moves the main valve 50 and the pilot valve 52 between their respective open positions and closed positions in response to the pivotal movement of the actuator 48.

Referring specifically to FIG. 2A, the main valve 50 includes a main valve body 53. The main valve body 53 includes a face 54 having a preferably circular shape. A sealing member 56, formed of a material suitable for sealing, such as a carboxylated nitrile material, is wrapped around the main valve body 53 adjacent to the face 54. When the valve assembly 46 is in the closed position, the face 54 acts with the sealing member 56 to close the outlet 32 of the bore 28, preventing any fluid from exiting the outlet 32. The main valve body 53 defines an aperture 58 extending completely therethough. The aperture 58 includes a first section 60, a second section 61, and a third section 62, each of progressively larger diameter.

The pilot valve 52 is coupled to the main valve 50. The pilot valve 52 includes a body portion 67 that is at least partially disposed within the third section 62 of the aperture 58. The body portion 67 has a diameter slightly smaller than a diameter of the third section 62 to define an annular space therebetween. The pilot valve 52 further includes a head portion 69 that is at least partially disposed within the second section 61 of the aperture 58. The head portion 69 has a diameter that is slightly smaller than a diameter of the second section 61 to define an annular space therebetween. The first section 60 opens through the face 54 and has a diameter smaller than the head portion 69.

A sealing member 71, e.g., an o-ring seal, is disposed in the second section 61 about the first section 60. The sealing member 71 is made of a material suitable for sealing, such as a nitrile material. The head portion 69 abuts the sealing member 71 to close fluid flow through the aperture 58 when the pilot valve 52 is in the closed-pilot valve position. The head portion 69 is unseated from the sealing member 71 when the pilot valve 52 moves to the open-pilot valve position. The pilot valve 52 is moveable within the second 61 and third 62 sections during the pivotal movement of the actuator 48.

A pair of retainer pins 64 are disposed in the third section 62 of the aperture 58 for coupling the pilot valve 52 to the main valve 50. The main valve 50 defines a first opening 66 and a second opening 68 for receiving the retainer pins 64. It is to be appreciated that the retainer pins 64 may comprise any other retainer device so as to slidably couple the pilot valve 52 to the main valve 50.

The pilot valve 52 is configured for moving or sliding a predetermined distance in the aperture 58 relative to the main valve 50 during actuation before engaging the main valve 50 to unseat the main valve 50 from its position at the outlet 32. In particular, the pilot valve 52 defines a travel path 70 for the retainer pins 64. The travel path 70 is defined as an annular groove in the body portion 67 of the pilot valve 52. The pilot valve 52 includes an abutment 74 defining one end of the travel path 70. The abutment 74 is spaced from the retainer pins 64 when the pilot valve 52 is in the closed-pilot valve position. As the actuator 48 is pivoted toward the outlet 32 to move the valve assembly 46 to the open position, the pilot valve 52 is initially moved to the open-pilot valve position and the abutment 74 moves toward the retainer pins 64. The main valve 50 remains stationary. After the pilot valve 52 reaches the open-pilot valve position, further pivoting of the actuator 48 toward the outlet 32 abuts the abutment 74 against the retainer pins 64, thus pulling the main valve 50 toward the open-main valve position. Thus, the pilot valve 52 is opened before the main valve 50 is opened.

It should be understood that the coupling of the pilot valve 52 to the main valve 50 may be configured other than that shown in the exemplary embodiment. The retainer pins 64 and the travel path 70 is one example in which the pilot valve 52 is moveably coupled to the main valve 50. For example, the pilot valve 52 may be designed to receive one retainer pin rather than a pair of retainer pins.

Figure 3:
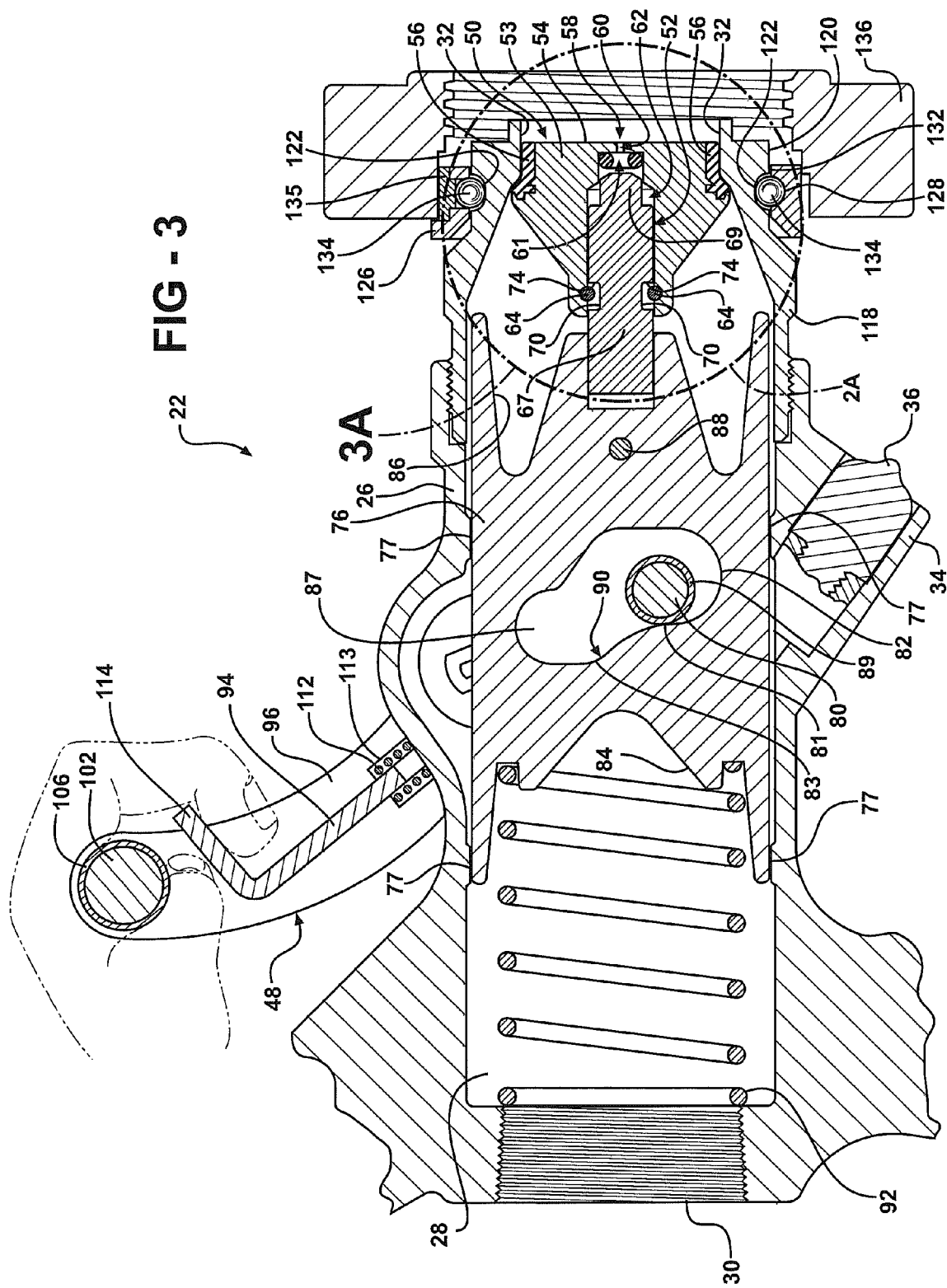
FIG. 3 is a cross-sectional view of the transfer device illustrating the main valve in the closed-main valve position and the pilot valve in an open-pilot valve position.
Figure 4:
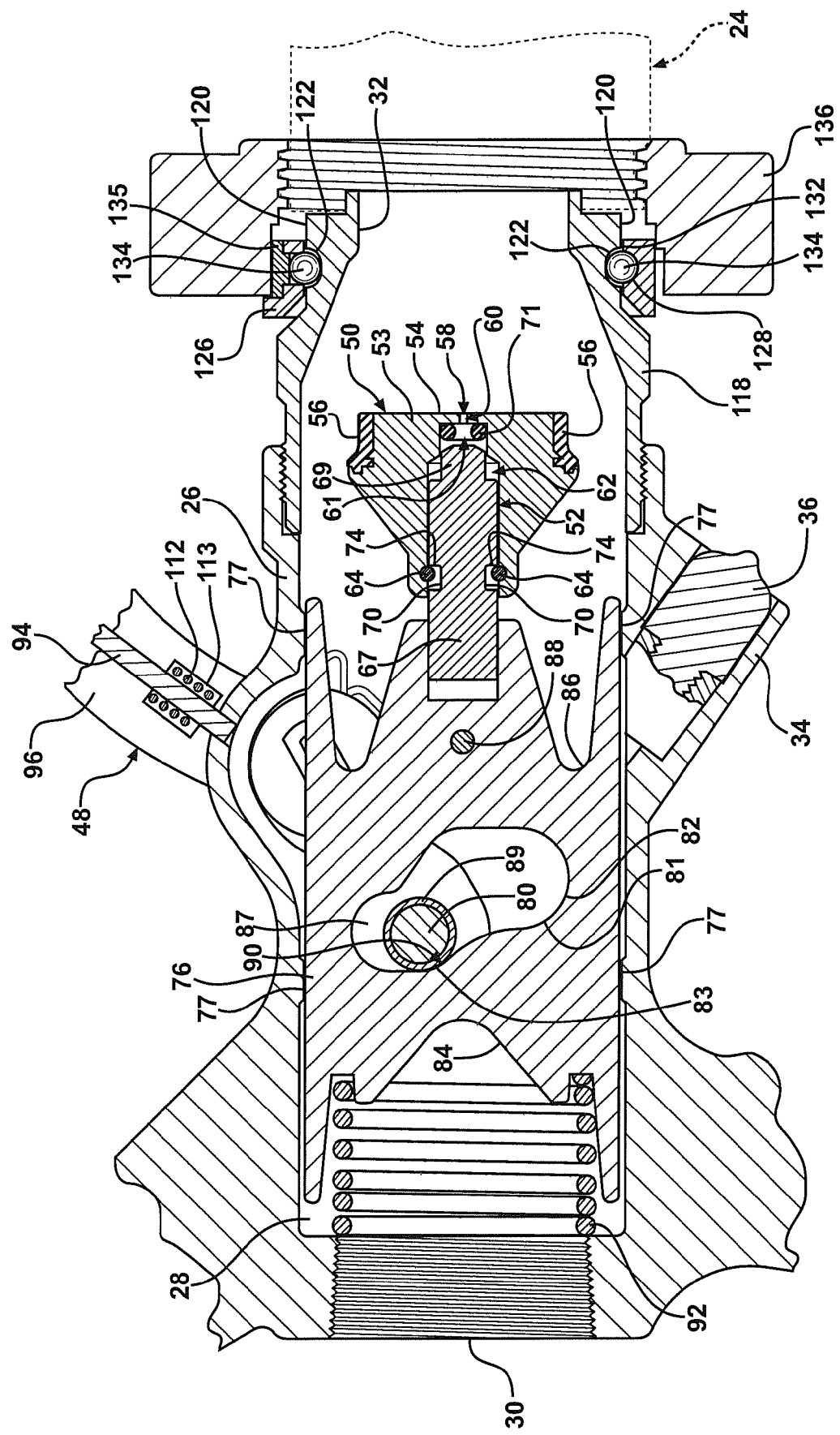
FIG. 4 is a cross-sectional view of the transfer device illustrating the main valve in an open-main valve position and the pilot valve in the open-pilot valve position.
Figure 5:
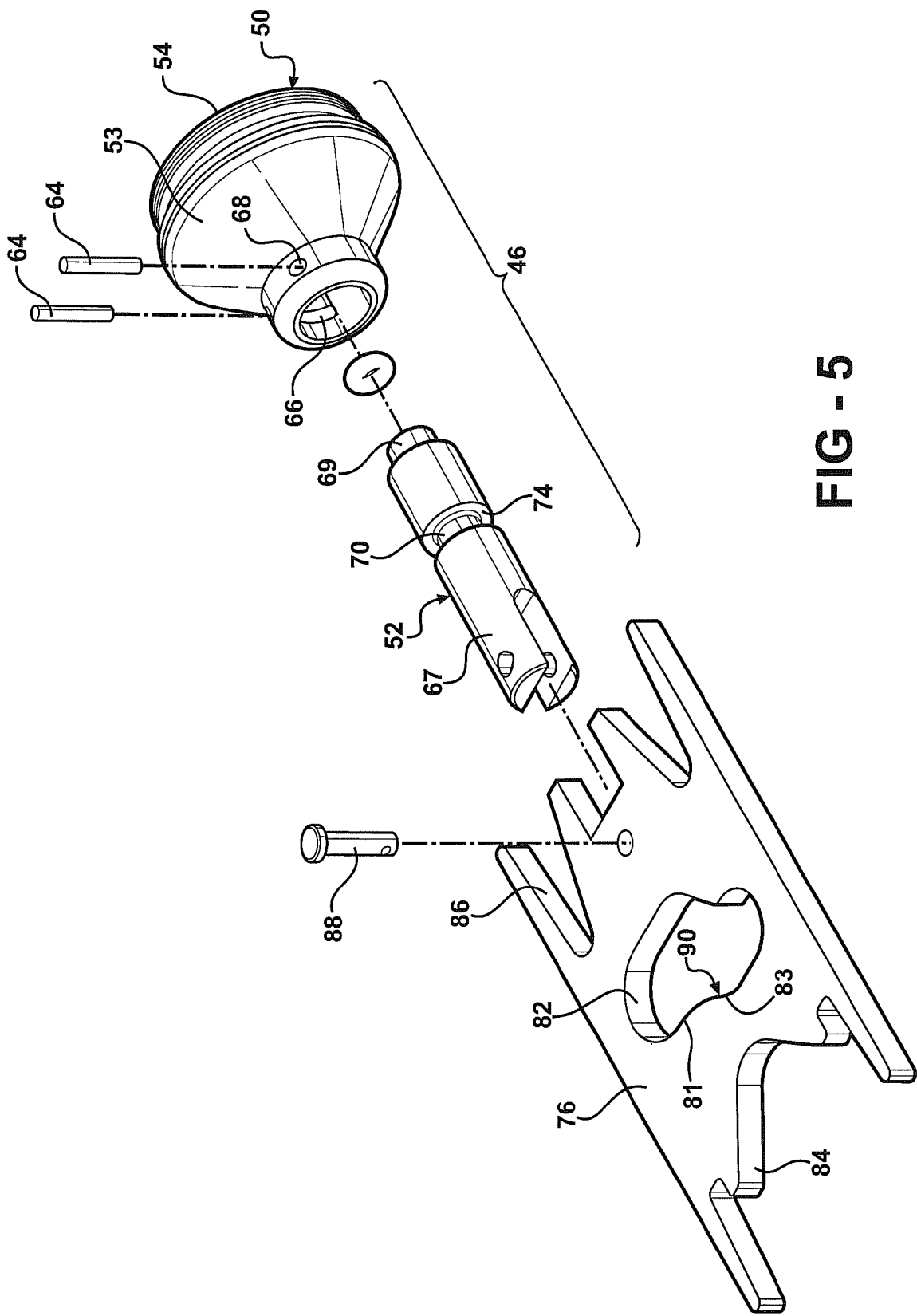
FIG. 5 is a perspective assembly view of the main valve, the pilot valve, and a cam plate.

Referring now to FIGS. 2-4, a cam plate 76 is disposed in the bore 28 of the housing 26 between the inlet 30 and the outlet 32. The cam plate 76 may be made of a metal or alloy, such as stainless steel or carbon steel or any other suitable material. The cam plate 76 is slideably coupled to the housing 26 and interconnects the actuator 48 and the valve assembly 46. More specifically, the housing defines guide grooves 77 (see also FIG. 6) inside the bore 28 for slideably receiving and retaining the cam plate 76. The guide grooves 77 (4 total in the embodiment shown) are diametrically opposed to one another to align the cam plate 76 top to bottom. The guide grooves 77 are sized slightly larger than a width of the cam plate 76 to allow smooth sliding motion, but still retain the cam plate 76.

A crank assembly 78 operatively connects the actuator 48 to the cam plate 76. The crank assembly 78 forms part of the actuator 48 and is moveable about the pivot axis P when the actuator 48 is actuated. More specifically, the crank assembly 78 includes a crank shaft 85 (see also FIGS. 6 and 7) that is moveable about the pivot axis P. A crank plate 87 interconnects the crank shaft 85 and a crank pin 80 to fix these components together. As the actuator 48 is rotated about the pivot axis P, the crank shaft 85 rotates about the pivot axis P, thereby moving the crank pin 80.

The cam plate 76 is moveable by the crank assembly 78. More specifically, the cam plate 76 defines a slot having a cam profile 82 with first 81 and second 83 distinct locations for receiving the crank pin 80 of the crank assembly 78. The crank pin 80 is moveable along the cam profile 82 among the first 81 and second 83 locations by the pivotal movement of the actuator 48, whereby movement of the crank pin 80 along the cam profile 82 moves the cam plate 76 in an axial direction in the bore 28. The crank pin 80 may be made of a metal or alloy, such as stainless steel or carbon steel or any other suitable material. A cylindrical sleeve 89, preferably formed of a nylon material, covers the crank pin 80 for reducing friction as the crank pin 80 moves along the cam profile 82. A retainer ring 91 is coupled to the crank pin 80 for retaining the cylindrical sleeve 89 to the crank pin 80.

The cam plate 76 further includes a first yoke 84 and a second yoke 86. A pin fastener 88 couples the valve assembly 46 to the second yoke 86 of the cam plate 76. It is to be appreciated that any other suitable fastener may be used. In particular, the pin fastener 88 axially fixes the cam plate 76 to the pilot valve 52 such that any axial movement of the cam plate 76 moves the pilot valve 52. The valve assembly 46 is connected in series to the cam plate 76 with the valve assembly 46 located directly in front of the cam plate 76 toward the outlet 32 of the bore 28. The crank assembly 78 moves the cam plate 76 toward the inlet 30 of the bore 28 in the axial direction in response to the pivotal movement of the actuator 48 toward the outlet 32, thus pulling the valve assembly 46 toward the inlet 30 of the bore 28 also in an axial direction.

FIG. 2 shows the crank pin 80 engaged in the first, lower location 81 of the cam profile 82, wherein the main valve 50 is in the closed-main valve position and the pilot valve 52 is in the closed-pilot valve position. Although difficult to see in FIG. 3, upon slight pivoting of the actuator 48, the crank pin 80 moves slightly in the first location 81 along the cam profile 82 such that the cam plate 76 pulls the pilot valve 52 to the open-pilot valve position. The main valve 50 remains in the closed-main valve position. As shown in FIG. 4, further pivoting of the actuator 48 engages the crank pin 80 in the second, upper location 83 of the cam profile 82, wherein the cam plate 76 pulls the pilot valve 52 such that the abutment 74 of the travel path 70 of the pilot valve 52 engages the retainer pins 64 of the main valve 50, thereby pulling the main valve 50 to the open-main valve position.

The cam profile 82 is designed to reduce the effort required to pivot the actuator 48 away from the outlet 32 to move the valve assembly 46 from the open position to the closed position, i.e., move the crank pin 80 from the second location 83 to the first location 81. The cam profile 82 defines a detent pocket 90 at the second location 83 to hold the crank pin 80 in the second location 83.

A spring 92 is disposed between the inlet 30 of the bore 28 and the cam plate 76 for biasing the cam plate 76 against the crank pin 80 so as to hold the crank pin 80 in the detect pocket 90 when the valve assembly 46 is open. The spring 92 may be made of a metal or alloy, such as stainless steel or carbon steel or any other suitable material. The detent pocket 90 is designed such that the crank pin 80 is easily moved out from the detent pocket 90, while still providing enough retention to hold the crank pin 80. The force necessary to rotate the actuator 48 away from the outlet 32 to move the crank pin 80 out of the detent pocket 90 is small.

Essentially, pivoting of the actuator 48 need only move the crank pin 80 over a humped profile section between the second location 83 and the first location 81. Once the crank pin 80 is manually moved over the humped profile by the operator, the spring force takes over and axially pushes the cam plate 76 and valve assembly 46 to close the valve assembly. The amount of pivoting of the actuator 48 required by the operator to move the crank pin 80 out of the detent pocket 90 is less than 90 degrees, more preferably less than 45 degrees, and most preferably less than 15 degrees.

Figure 6:
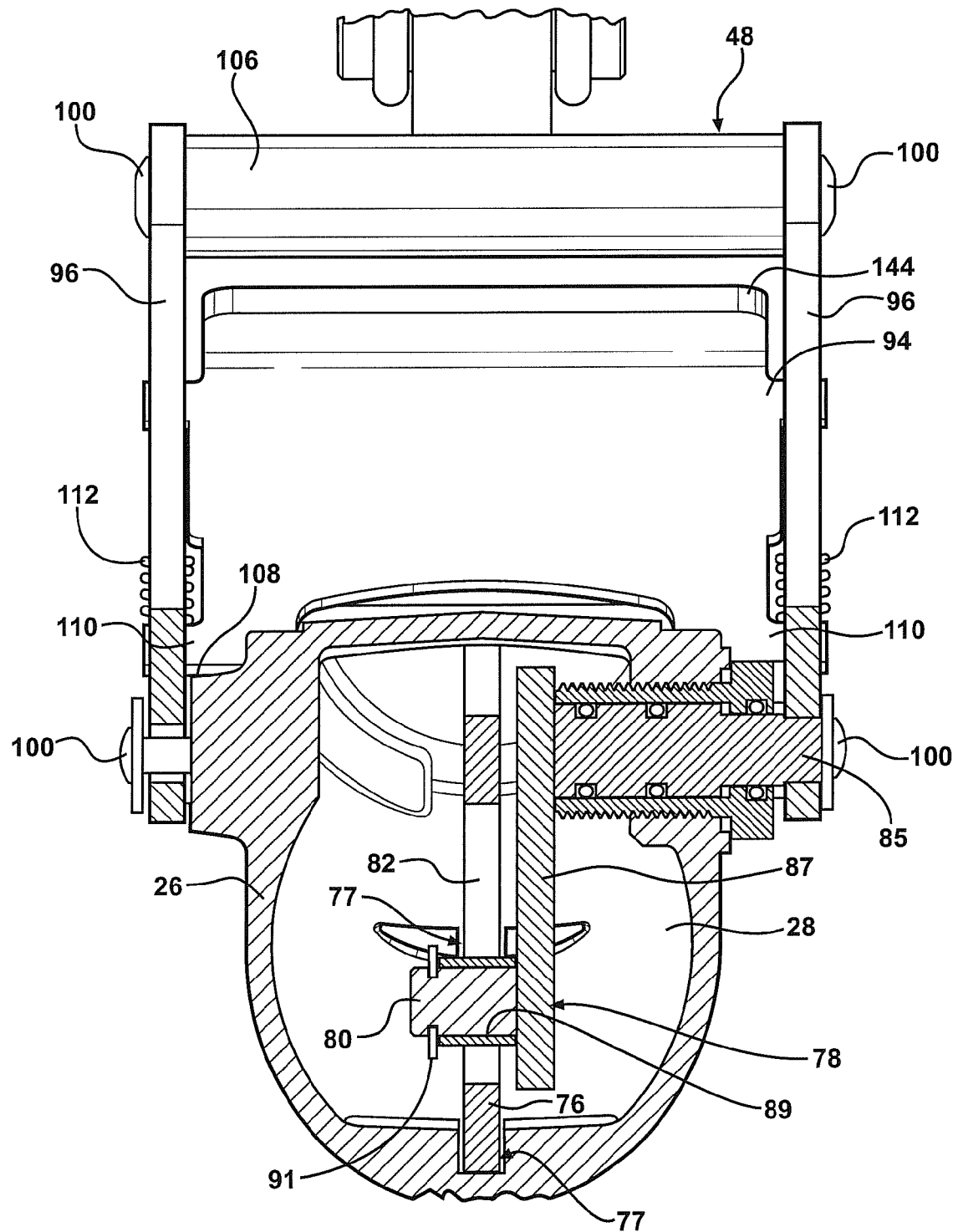
FIG. 6 is a cross-sectional view of the transfer device taken generally along the line 6-6 in FIG. 2.
Figure 7:
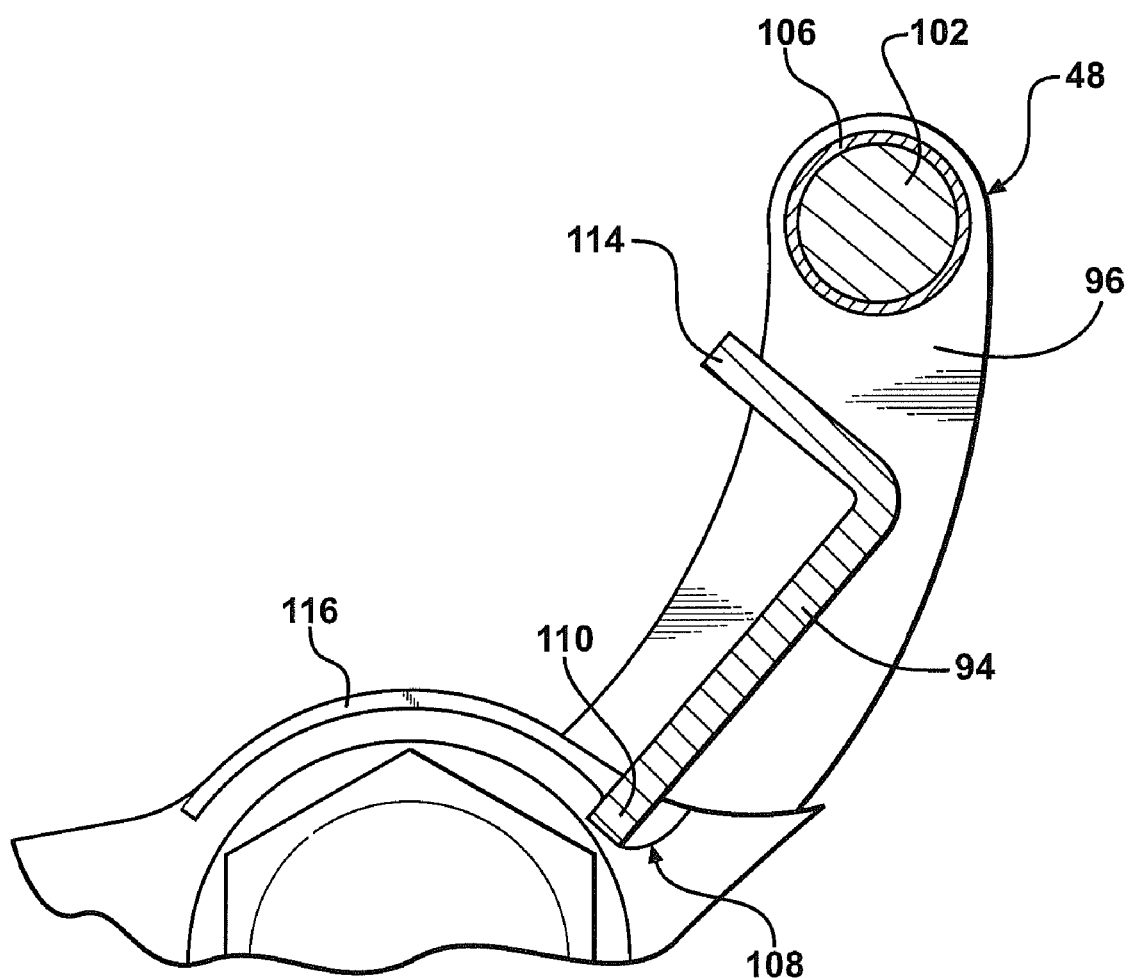
FIG. 7 is a side view of an actuator with a lock illustrating the lock in a locked position.

Referring now to FIGS. 1, 6, 7 and 8, the actuator 48 generally has a U-shaped configuration, although other configurations may be utilized. A lock 94 is integrated with the actuator 48 and moveable between a locked position and an unlocked position. The actuator 48 includes a pair of arms 96 for coupling the lock 94 to the actuator 48. A screw fastener 100 pivotally couples each of the arms 96 to the housing 26 of the transfer device 22. As best shown in FIG. 6, the screw fastener 100 fixes one of the arms 96 to the crank shaft 85 of the crank assembly 78, thereby providing the crank assembly 78 with pivotal movement about the pivot axis P when the actuator 48 is rotated. It is to be appreciated that any suitable fastener may be used. A grasping rod 102 interconnects the arms 96 for grasping the actuator 48 to pivot the actuator 48 about the pivot axis. A screw fastener 100 couples the rod 102 to the arms 96 of the actuator 48. A grip 106, preferably made of a plastic material, is coupled to the rod 102 for providing comfort when grasping the rod 102 to rotate the actuator 48.

The housing 26 of the transfer device 22 defines a pair of catches 108, or pockets, for receiving and engaging the lock 94 when the valve assembly 46 is in the closed position. More specifically, the lock 94 includes a pair of tabs 110 for engaging the catches 108. The lock 94 is in the locked position when the tabs 110 are engaged in the catches 108, thus preventing the actuator 48 from pivoting about the pivot axis P to move the valve assembly 46 from the closed position to the open position. The lock 94 is in the unlocked position when the tabs 110 of the lock 94 are moved out from the catches 108, thus allowing the actuator 48 to pivot about the pivot axis P to move the valve assembly 46 from the closed position to the open position.

A lock spring 112 is disposed in slots 113 in each of the arms 96 of the actuator 48. The lock springs 112 are coupled to the lock 94 and act between the arms 96 and the lock 94 such that the lock springs 112 bias the tabs 110 of the lock 94 toward the catches 108. The lock 94 further includes a lip 114 for simultaneously grasping the lock 94 with the grip 106 of the actuator 48 to move the tabs 110 of the lock 94 away from the catches 108 (see FIG. 3). It is to be appreciated that any number of catches 108 and tabs 110 may be used to engage and disengage the lock.

The housing 26 of the transfer device 22 further defines a pair of contoured recesses 116 for guiding the tabs 110 of the lock 94 during the pivotal movement of the actuator 48. As mentioned above, the lock 94 is moveable between a locked position and an unlocked position. As the lock 94 is moved from the locked position to the unlocked position by grasping and pulling the lip 114 of the lock 94 away from the catches 108, slight pivoting of the actuator 48 engages the tabs 110 of the lock 94 with the recesses 116. The recesses 116 hold the lock 94 in the unlocked position, thereby allowing the actuator 48 to fully pivot and move the valve assembly 46 from the closed position to the open position. The tabs 110 of the lock 94 follow the recesses 116 during the pivotal movement of the actuator 48. As the tabs 110 of the lock 94 pass back over the catches 108 when the valve assembly 46 is being moved back to the closed position, the tabs 110 engage in the catches 108 with assistance from the bias of the lock springs 112.

Figure 8:
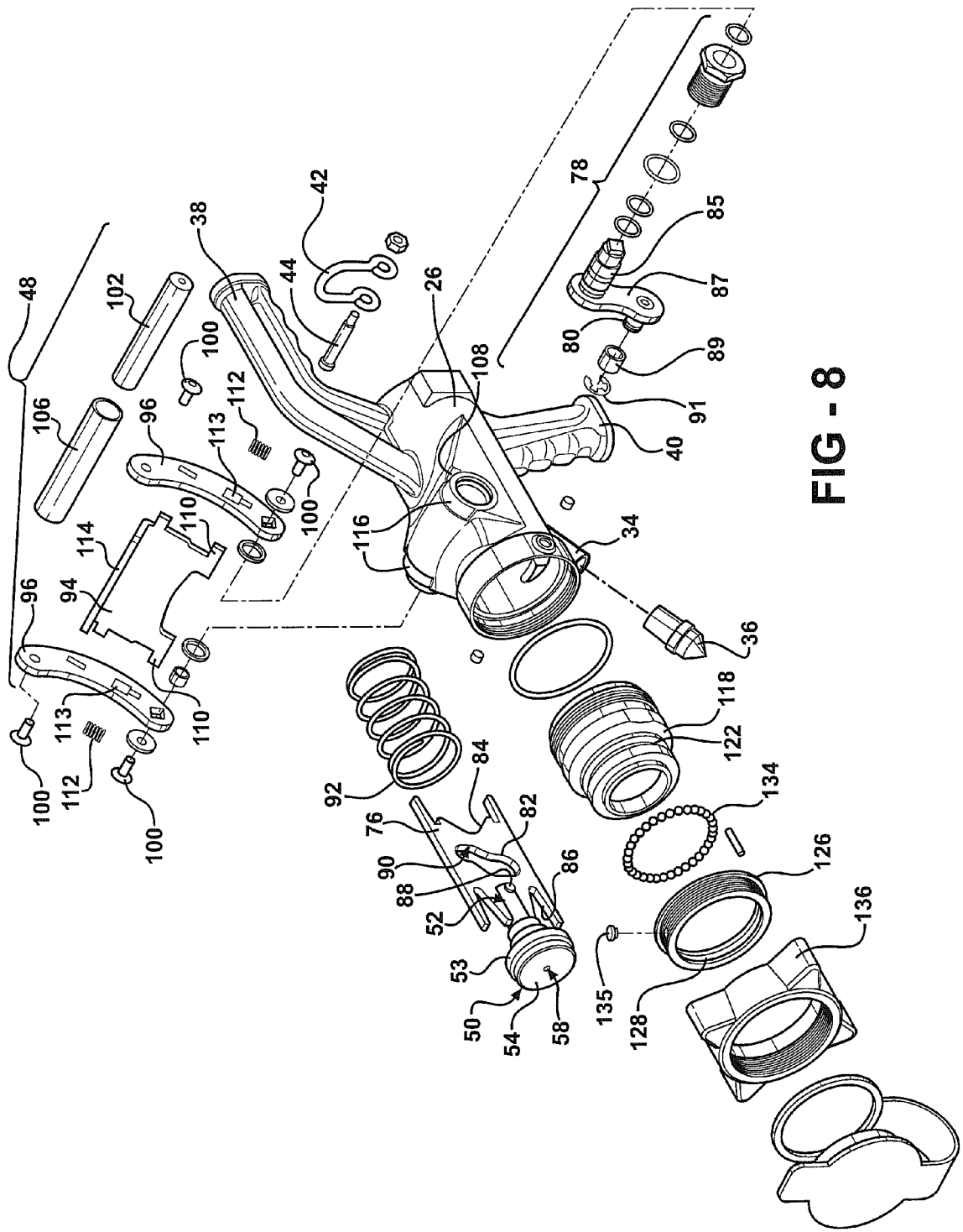
FIG. 8 is an exploded perspective view of the transfer device.

Referring now to FIGS. 8, 9, and 9A, the components for coupling the transfer device 22 to the dry break coupler 24 will be discussed. A nut adapter 118 forms part of the housing 26 and defines the outlet 32 of the bore 28. A connector is pivotally and rotatably coupled to the nut adapter 118. The connector includes a coupling element, hereinafter referred to as a joint member 126 and a threaded collar 136 fixed to the joint member 126. The joint member 126 is pivotally and rotatably coupled to the nut adapter 118. The nut adapter 118 and the joint member 126 may both be made of a metal or alloy, preferably 4140 high grade tool steel, or any other suitable material. The threaded collar 136 may be made of a metal or alloy, such as brass or steel, or any other suitable material.

The nut adapter 118 defines a first annular race 122 having a first width 124. The joint member 126 defines a second annular race 128 having a second width 130. The first race 122 is defined by a first race surface 120 and the second race 128 is defined by a second race surface 132 such that when the nut adapter 118 is coupled to the joint member 126, the second race surface 132 is spaced from the first race surface 120 to define a gap therebetween. A plurality of bearing members, e.g., ball bearings 134, are disposed between the first race 122 and the second race 128. A bearing plug 135 is disposed in the joint member 126 for plugging the ball bearings 134 and securing the ball bearings 134 in the races 122, 128. The threaded collar 136 is configured for coupling to the dry break coupler 24. The threaded collar 136 and the joint member 126 are rotatable about the ball bearings 134 relative to the nut adapter 118 for screwing the threaded collar 136 to the dry break coupler 24.

Referring specifically to FIGS. 9 and 9A, the first width 124 of the first race 122 is greater than the second width 130 of the second race 128. The first race 122 preferably has a parabolic shape with a first radius and a second radius. A flat middle portion 137 connects the first radius and the second radius. The first and second radii are equal in some embodiments. The middle portion 137 preferably has a length of from about 0.01 inches to about 0.1 inches. More preferably, the middle portion 137 is from about 0.05 inches to about 0.07 inches. Most preferably, the middle portion 137 is about 0.06 inches. The second race 128 has a circular shape with a uniform radius matching the shape of the ball bearings 134. The configuration of the nut adapter 118, the joint member 126 and the races 122, 128 allows for a pivoting motion of the threaded collar 136 relative to the nut adapter 118. In particular, the threaded collar 136 is capable of pivoting between a plurality of angular positions relative to the longitudinal axis A (see FIG. 9A). The pivoting motion eases installation when coupling the transfer device 22 to the dry break coupler 24.

Figure 10:
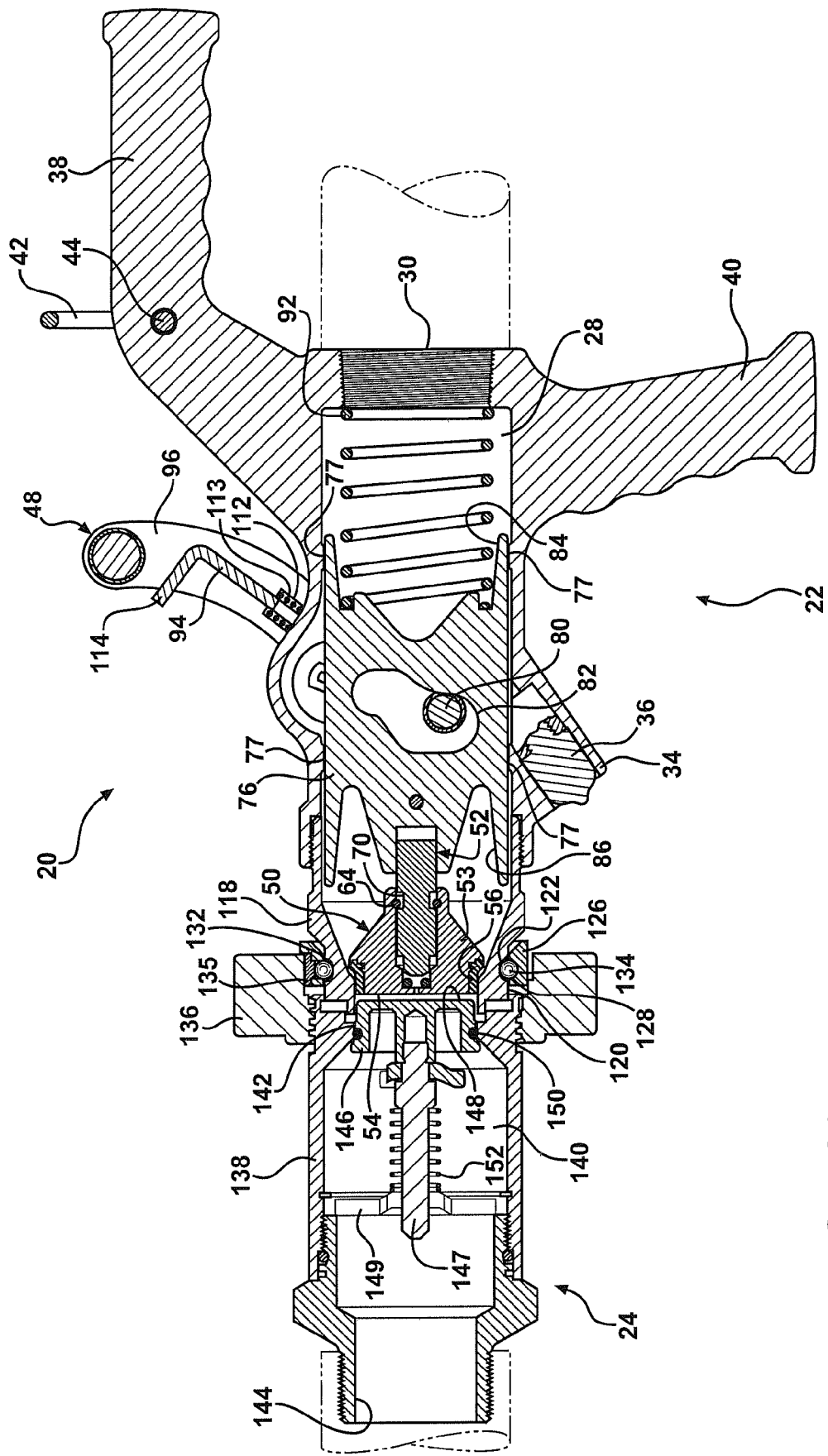
FIG. 10 is a cross-sectional view of the transfer device coupled to the dry break coupler illustrating the main valve in the closed-main valve position, the pilot valve in the closed-pilot valve position, and a coupler valve in a closed-coupler valve position.
Figure 11:
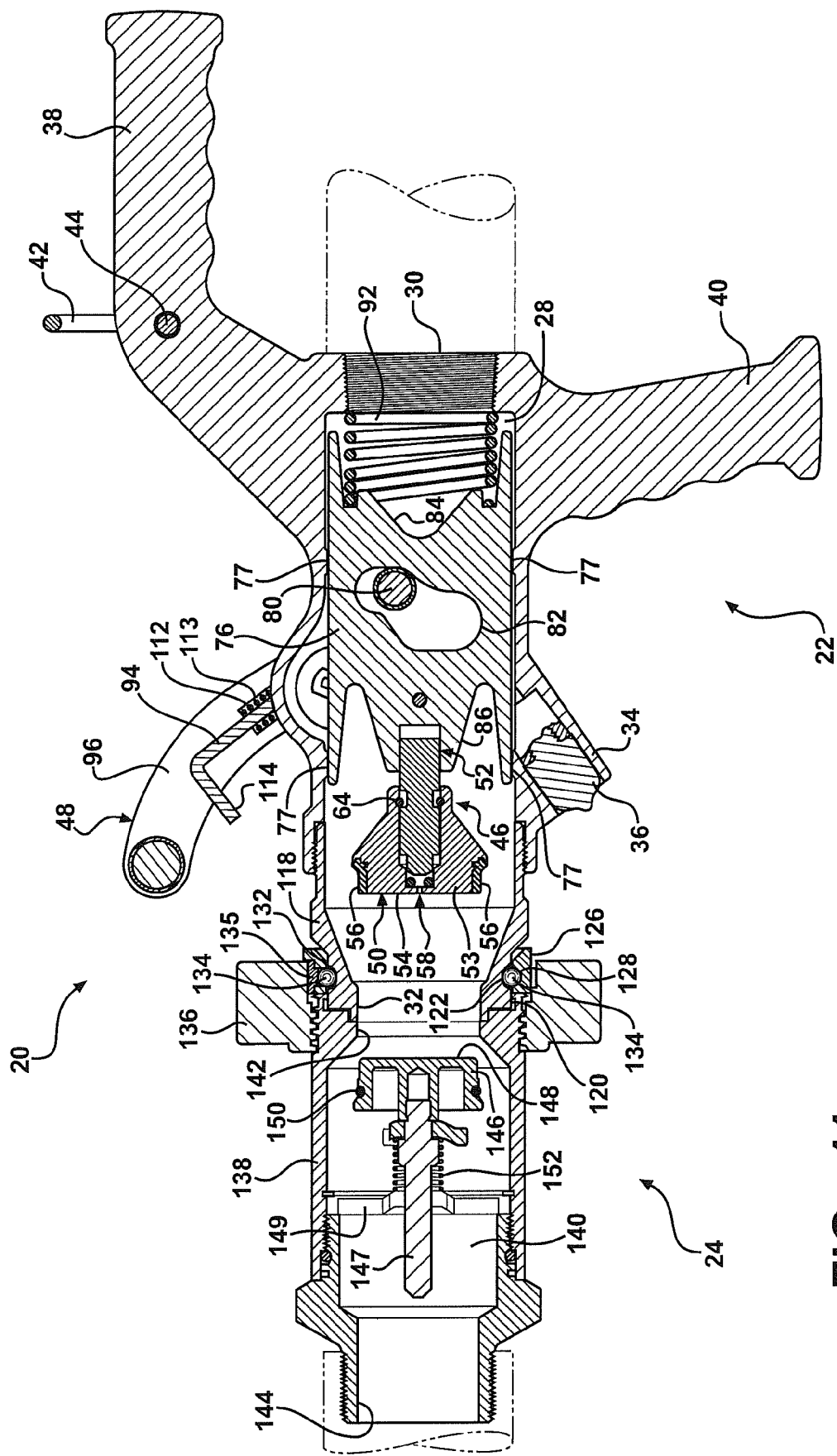
FIG. 11 is a cross-sectional view of the transfer device coupled to the dry break coupler illustrating the main valve in the closed-main valve position, the pilot valve in the open-pilot valve position, and the coupler valve in the closed-coupler valve position.

Referring now to FIGS. 10-11, the dry break coupler 24 includes a coupler housing 138 defining a coupler bore 140. The coupler bore 140 includes a coupler inlet 142 and a coupler outlet 144. The coupler inlet 142 receives the transfer device 22 for fluid communication between the fluid source and the fluid destination. A coupler valve 146 is disposed in the coupler bore 140 and is moveable between an open-coupler valve position and a closed-coupler valve position. The coupler valve 146 includes a valve face 148 of a circular shape. The coupler valve 146 abuts the coupler inlet 142 of the coupler bore 140 when the coupler valve 146 is in the closed-coupler valve position.

A coupler seal 150, preferably formed of a material suitable for sealing, such as an elastomeric material, is wrapped around the coupler valve 146 to prevent the fluid from leaking out of the dry break coupler 24 when the coupler valve 146 is in the closed-coupler valve position. A coupler spring 152 continuously biases the coupler valve 146 in the closed-coupler valve position. The coupler valve 146 includes a guide rod 147. A guide mount 149 is fixed to the coupler housing 138 and slidably receives the guide rod 147 as the coupler valve 146 moves between its open and closed positions. The dry break coupler 24 further includes a pressure relief valve 154 (see FIG. 1) for relieving the fluid in instances where the pressure inside the coupler bore 140 exceeds a predefined limit.

The operation of the fluid transfer system will now be discussed. FIG. 10 shows the transfer device 22 coupled to the dry break coupler 24 with the valve assembly 46 of the transfer device 22 in the closed position and the coupler valve 146 of the dry break coupler 24 in the closed position. The configuration minimizes a space between the face 54 of the main valve 50 and the coupler valve face 148. The minimized space reduces fluid emissions upon disconnecting the transfer device 22 from the dry break coupler 24. The minimized space is achieved due to the proximity of the main valve 50 to the outlet 32 and the proximity of the coupler valve 146 to the coupler inlet 142.

Once the transfer device 22 is securely coupled to the dry break coupler 24, the actuator 48 is pivoted toward the outlet 32, thereby moving the crank pin 80 along the cam profile 82 of the cam plate 76. The crank pin 80 follows the cam profile 82 and moves the cam plate 76 slightly in the first location, thereby moving the pilot valve 52 from the closed-pilot valve position to the open-pilot valve position. With the pilot valve 52 in the open-pilot valve position, the fluid is allowed to flow from the bore 28 of the transfer device 22 through the aperture 58 and into the space between the face 54 of the main valve 50 and the coupler valve face 148.

Figure 3A:
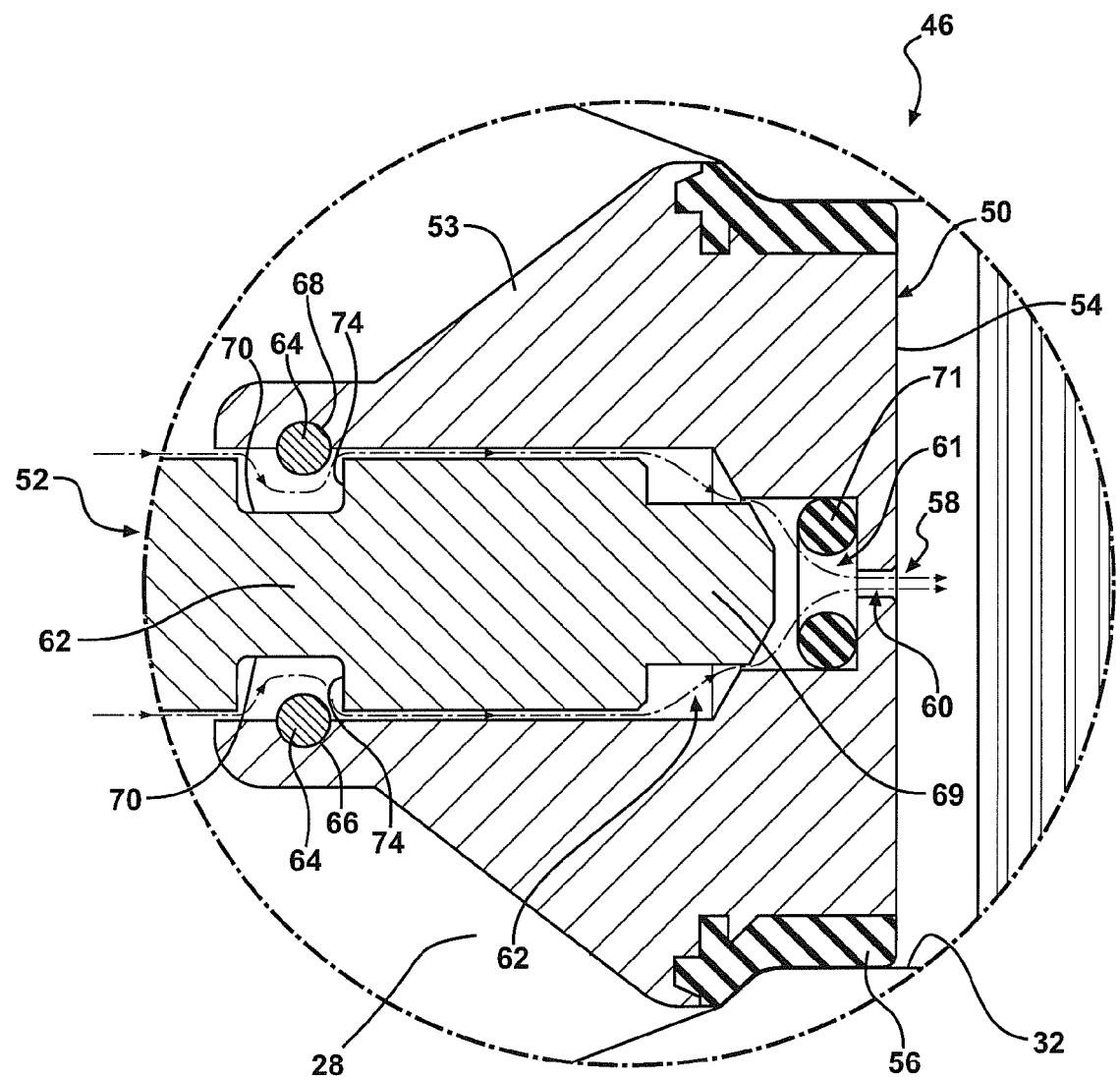
FIG. 3A is an exploded cross-sectional view of the main valve and the pilot valve illustrated in FIG. 3.

More specifically, as the pilot valve 52 is moved to the open-pilot valve position, the fluid flows through the third section 62 and the second section 61 of the aperture 58 of the main valve 50, in the annular spaces between the pilot valve 52 and the main valve body 53, and then through the first section 60 of the aperture 58, whereby the fluid enters the space between the face 54 of the main valve 50 and the coupler valve face 148 (see the illustration of FIG. 3A). It should be appreciated that the retainer pins 64 and the travel path 70 of the pilot valve 52 are configured such that the fluid flow will not be blocked, i.e., the configuration does not act as a seal. This is also true when the abutment 74 engages the retaining pins 64.

The pilot valve 52 allows the fluid pressure to equalize in the bore 28 of the housing 26 of the transfer device 22 and in the space between the face 54 of the main valve 50 and the coupler valve face 148. In other words, the pressure of the fluid is equal in front of and behind the main valve 50. As a result, the effort required to pivot the actuator 48 and move the main valve 50 from the closed-main valve position to the open main-valve position is substantially reduced. Without this pressure equalization, the operator would have to act against the fully pressurized force of the fluid acting behind the main valve 50 to open the main valve 50. This feature reduces any inadvertent pivoting of the actuator 48 and opening of the main valve 50. For example, when the transfer device 22 is disconnected from the receiver, pressure of the fluid behind the main valve 50 is at the fluid pressure (which can be up to about 375 psi in the case of liquid propane), while pressure in front of the main valve 50 is at atmosphere. It's not until the main valve 50 is coupled to the receiver and pressure can be equalized in front of and behind the main valve 50 that the operator can easily open the main valve.

When the main valve 50 reaches the open-main valve position, the fluid exits the bore 28 through the outlet 32 applying a force to the coupler valve face 148. The force moves the coupler valve 146 from the closed-coupler valve position to the open-coupler valve position, and enters the coupler bore 140 of the dry break coupler 24, thereby allowing fluid transfer from the fluid source to the fluid destination. To stop fluid communication between the fluid source and the fluid destination, the actuator 48 is pivoted to move the valve assembly 46 from the open position to the closed position as previously described.

The present invention has been described herein in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described within the scope of the appended claims.

What is claimed is:

1. A transfer device for transferring fluid, said device comprising:
   a housing defining an inlet, an outlet, and a longitudinal axis;
   an actuator pivotally coupled to said housing about a pivot axis transverse to said longitudinal axis, said actuator having a grasping portion moveable fore and aft relative to said housing to pivot said actuator about said pivot axis;
   a lock operatively coupled to said actuator and movable between a locked position in which said grasping portion is prevented from moving fore and aft and an unlocked position in which said grasping portion is free for moving fore and aft;
   a collar coupled to said housing and rotatable relative to said housing, said collar including threads;
   a valve assembly disposed in said housing, said valve assembly including a main valve moveable between an open-main valve position and a closed-main valve position and a pilot valve moveable between an open-pilot valve position and a closed-pilot valve position, said actuator operatively coupled to said valve assembly such that said pilot valve and said main valve are both moveable between their respective said open and said closed positions in response to movement of said grasping portion with said pilot valve reaching said open-pilot valve position before said main valve reaches said open-main valve position whereby said pilot valve reaches said open-pilot valve position first to equalize pressure on both sides of said main valve and enable movement of said main valve to said open-main valve position; and a biasing device disposed in said housing and coupled to said valve assembly for biasing both said pilot valve and said main valve toward their respective said closed positions.

2. A transfer device as set forth in claim 1 wherein said main valve defines an aperture for conveying a flow of fluid therethrough when said pilot valve is in said open-pilot valve position.

3. A transfer device as set forth in claim 2 wherein said pilot valve is coupled to said main valve and is at least partially disposed within said aperture and moveable within said aperture during said movement of said actuator.

4. A transfer device as set forth in claim 3 further including a retainer disposed in said aperture for coupling said pilot valve to said main valve.

5. A transfer device as set forth in claim 4 wherein said pilot valve defines a travel path receiving said retainer such that said retainer rides in said travel path prior to said pilot valve engaging said retainer during movement of said actuator.

6. A transfer device as set forth in claim 5 wherein said pilot valve includes an abutment defining one end of said travel path with said abutment spaced from said retainer when said pilot valve is in said closed-pilot valve position and said abutment moving toward said retainer when said pilot valve is moved toward said open-pilot valve position such that said abutment engages said retainer for moving said main valve to said open-main valve position.

7. A transfer device as set forth in claim 2 further including a seal disposed in said aperture for sealing between said pilot valve and said main valve to prevent the flow of fluid through said aperture when said pilot valve is in said closed-pilot valve position.

8. A transfer device as set forth in claim 1 wherein said pilot valve includes a body and a head extending forward from said body.

9. A transfer device as set forth in claim 8 wherein said aperture defines a first section having a first diameter and a second section having a smaller second diameter such that said body of said pilot valve is at least partially disposed in said first section of said aperture and said head of said pilot valve is at least partially disposed in said second section of said aperture.

10. A transfer device as set forth in claim 9 wherein said aperture further defines a third section having a third diameter smaller than said second diameter such that the flow of fluid passes through said third section to exit said aperture of said main valve.

11. A transfer device for transferring fluid, said device comprising:
a housing defining an inlet, an outlet, and a longitudinal axis;
an actuator pivotally coupled to said housing about a pivot axis transverse to said longitudinal axis, said actuator having a grasping portion moveable fore and aft relative to said housing to pivot said actuator about said pivot axis;
a collar coupled to said housing and rotatable relative to said housing, said collar including threads;
a valve assembly disposed in said housing, said valve assembly including a main valve moveable between an open-main valve position and a closed-main valve position and a pilot valve moveable between an open-pilot valve position and a closed-pilot valve position,
said actuator operatively coupled to said valve assembly such that said pilot valve and said main valve are both moveable between their respective said open and said closed positions in response to movement of said grasping portion with said pilot valve reaching said open-pilot valve position before said main valve reaches said open-main valve position whereby said pilot valve reaches said open-pilot valve position first to equalize pressure on both sides of said main valve and enable movement of said main valve to said open-main valve position; and
a biasing device disposed in said housing and coupled to said pilot valve for biasing said pilot valve toward said closed position.

12. A transfer device for transferring fluid, said device comprising:
a housing defining an inlet, an outlet, and a longitudinal axis;
an actuator coupled to said housing and having a grasping portion moveable fore and aft relative to said housing to move said actuator;
a collar coupled to said housing and rotatable relative to said housing, said collar including threads;
a valve assembly disposed in said housing, said valve assembly including a main valve moveable between an open-main valve position and a closed-main valve position and a pilot valve moveable between an open-pilot valve position and a closed-pilot valve position,
said actuator operatively coupled to said valve assembly such that said pilot valve and said main valve are both moveable between their respective said open and said closed positions in response to movement of said grasping portion with said pilot valve reaching said open-pilot valve position before said main valve reaches said open-main valve position whereby said pilot valve reaches said open-pilot valve position first to equalize pressure on both sides of said main valve and enable movement of said main valve to said open-main valve position; and
a biasing device disposed in said housing and coupled to said pilot valve for biasing said pilot valve toward said closed position.

13. A transfer device as set forth in claim 12 wherein said main valve defines an aperture for conveying a flow of fluid therethrough when said pilot valve is in said open-pilot valve position.

14. A transfer device as set forth in claim 13 further including a seal disposed in said aperture for sealing between said pilot valve and said main valve to prevent the flow of fluid through said aperture when said pilot valve is in said closed-pilot valve position.

15. A transfer device as set forth in claim 13 further including a retainer coupling said pilot valve to said main valve wherein said pilot valve is at least partially disposed within said aperture and moveable within said aperture during said movement of said actuator with said retainer limiting movement of said pilot valve in said aperture.

16. A transfer device as set forth in claim 12 further including a lock operatively coupled to said actuator and movable between a locked position in which said grasping portion is prevented from moving fore and aft and an unlocked position in which said grasping portion is free for moving fore and aft.

* * * * *